United States Patent
Bergeron (10) Patent No.: US 7,845,668 B2
(45) Date of Patent: Dec. 7, 2010

(54) DUAL TRAILER WITH LIFTING WHEELS FOR TRANSPORT WHEN EMPTY

(76) Inventor: Guy Bergeron, P.O. Box 147, Elie, Manitoba (CA) R0H 0H0

( * ) Notice: Subject to any disclaimer, the term of this patent is extended or adjusted under 35 U.S.C. 154(b) by 62 days.

(21) Appl. No.: 12/421,288

(22) Filed: Apr. 9, 2009

(65) Prior Publication Data

US 2009/0261559 A1 Oct. 22, 2009

(51) Int. Cl.
 B62D 53/00 (2006.01)
 B62D 53/08 (2006.01)
(52) U.S. Cl. .................. 280/412; 280/411.1; 280/405.1; 280/407.1; 280/474; 280/475; 280/476.1; 414/483
(58) Field of Classification Search ................ 280/412, 280/411.1, 405.1, 407.1, 474, 475, 476.1; 414/483
 See application file for complete search history.

(56) References Cited

U.S. PATENT DOCUMENTS

| 2,126,819 | A | * | 8/1938 | Schawiem | 280/476.1 |
| 3,101,958 | A | * | 8/1963 | Geron | 280/423.1 |
| 4,589,670 | A | | 5/1986 | Sweetin | |
| 7,017,934 | B2 | * | 3/2006 | Harris | 280/476.1 |
| 2010/0001489 | A1 | * | 1/2010 | Lundin | 280/476.1 |
| 2010/0172727 | A1 | * | 7/2010 | Watkins | 414/539 |

* cited by examiner

*Primary Examiner*—Lesley Morris
*Assistant Examiner*—Marlon A Arce
(74) *Attorney, Agent, or Firm*—Adrian D. Battison; Ade & Company Inc (57) ABSTRACT

A dual trailer has a first trailer with a king pin for a tractor and a rear fifth wheel for the king pin of a second trailer. The rear end of the first trailer and the front end of the second trailer is lifted into an empty transport position so that the first and second trailers are supported solely on the tractor and the rearmost axle of the second trailer. The remaining axles are held raised from the ground by the lifting of the trailers and by an individual lifting hook supporting the axle raised relative to the frame. In the empty transport position, the first and second trailers are maintained as a single integral trailer in a directly aligned position. Each axle includes an air bag so that the hook is engaged when the axle is raised relative to the frame by releasing the air from the bag.

11 Claims, 6 Drawing Sheets

DUAL TRAILER WITH LIFTING WHEELS FOR TRANSPORT WHEN EMPTY

This invention relates to a dual trailer arrangement arranged to be towed behind a highway tractor with an arrangement which allows many of the ground wheels to be lifted away from the ground when the trailer is towed while empty to save wear and to reduce rolling friction.

BACKGROUND OF THE INVENTION

Dual trailer arrangements particularly for gravel transport are known where there is a first trailer portion with a king pin at the front end for attachment to the fifth wheel of the tractor and two or three axles at the rear end. At the rear end there is a fifth wheel for receiving the king pin of a second trailer. In relation to gravel trailers it is common that the load box on the front trailer is located forward so that the load is applied primarily to the rear wheels of the tractor. The second trailer locates the load box in conventional symmetrical manner so as to apply its load to the rear wheels of the first trailer and the rear wheels of the second trailer. Commonly the front load box dumps to the side and the rear lead box dumps to the rear. Gravel trailers are typically empty on a return run. For reasons of economy it is desirable to lift ground wheels from the ground if they are not required to support a load. This reduces tire and wheel wear and reduces rolling resistance.

It is known to lift individual axles upwardly so that their wheels are removed from the roadway but this is complex and difficult to do on an automatic basis so that it is not widely used in gravel trucks.

U.S. Pat. No. 4,589,670 (Sweetin) issued May 20, 1986 shows an A-train arrangement in which a semi trailer is attached to the rear of a rigid truck by a trailing dolly and an arrangement for lifting the wheels of the dolly using a cylinder so that the trailer is supported temporarily only on the rear of the truck and the rear wheels of the trailer.

U.S. Pat. No. 2,126,819 (Schawlem) issued Aug. 16, 1938 shows a dolly towed behind a highway tractor with a trailer with a king pin mounted at the center of the dolly. The rear wheels of the dolly can then be lifted by a winch.

However both of these arrangements are used for back-up maneuverability and not for travel with the wheels raised at zero load.

SUMMARY OF THE INVENTION

It is one object of the invention to provide a dual trailer arrangement arranged to be towed behind a highway tractor with an arrangement which allows many of the ground wheels to be lifted away from the ground when the trailer is towed while empty to save wear and to reduce rolling friction.

According to one aspect of the invention there is provided a dual trailer arrangement for towing by a highway tractor having a fifth wheel supported over rear ground wheels, the arrangement comprising:

a first trailer portion with a king pin at the front end for attachment to a fifth wheel of the tractor and two or three axles defining rear wheels at the rear end;

a load box on the first trailer;

a second trailer having a king pin at a forward end and two or three axles defining rear wheels at the rear end;

a load box on the second trailer;

a fifth wheel at the rear end of the first trailer for receiving the king pin of a second trailer;

such that in a loaded position the trailers are supported on all axles;

a lifting arrangement for lifting the rear end of the first trailer and the front end of the second trailer into an empty transport position so that the first and second trailers are supported from the ground on the rear wheels of the tractor and the rear wheels of the second trailer with the rear wheels of the first trailer spaced from the ground;

and a locking arrangement for locking the first and second trailers in a directly aligned position with no freedom to pivot side to side at the king pin of the second trailer such that the first and second trailers can be towed as a single integral trailer supported only on the tractor and the rear wheels of the second trailer when the load boxes are empty.

The arrangement described herein is primarily proposed for gravel trailers with dump arrangements for the load boxes, but the same arrangement can be used for other trailers.

Preferably the angle of lifting is such that, in the empty transport position, only a rearmost one of the axles of the second trailer has its wheels on the ground.

Preferably the load box on the front trailer is located forward so that the load is applied primarily to the rear wheels of the tractor.

Preferably the second trailer locates the load box in conventional symmetrical manner so as to apply its load to the rear wheels of the first trailer and the rear wheels of the second trailer.

Preferably the front load box dumps to the side and the rear load box dumps to the rear.

Preferably the lifting arrangement is actuated by rearward movement of the first trailer relative to the second trailer. However other lifting arrangements including hydraulic cylinders can be used.

Preferably lifting arrangement includes a lifting surface arrangement on the second trailer which co-operates with a portion of the first trailer so that the rearward movement causes relative sliding movement between the lifting surface and the portion.

Preferably the king pin of the second trailer is arranged to move forwardly relative to the fifth wheel of the first trailer to a locking position in front of the fifth wheel.

Preferably the co-operation between the king pin of the second trailer in its locking position in front of the fifth wheel of the first trailer together with the co-operation of the lifting surface arrangement with the portion of the first trailer maintains the trailers in the empty transport position.

Preferably the co-operation between the king pin of the second trailer in its locking position in front of the fifth wheel of the first trailer together with the co-operation of the lifting surface arrangement with the portion of the first trailer maintains the trailers in the directly aligned position.

Preferably the king pin of the second trailer is moved into a slot on the first trailer holds the king pin against movement upwardly and downwardly and side to side.

Preferably the portion of the first trailer is mounted on a rear of the frame of the first trailer.

Preferably wherein the portion of the first trailer is tapered rearwardly and inwardly so as to provide a wedging action into a correspondingly shaped receptacle on the second trailer at the surface.

According to a second aspect of the invention there is provided dual trailer arrangement for towing by a highway tractor having a fifth wheel supported over rear ground wheels, the arrangement comprising:

a first trailer having first frame with a king pin at a front end for attachment to the fifth wheel of the tractor and at a rear end two or three axles having ground rear wheels thereon;

a load box on the first trailer;

a second trailer having a second frame with a king pin at a forward end and at a rear end a rearmost axle having ground rear wheels thereon and at least one additional axle having ground rear wheels thereon in front of the rearmost axle;

a load box on the second trailer;

a fifth wheel at the rear end of the first trailer for receiving the king pin of the second trailer;

such that in a loaded position the trailers are supported on all axles;

a lifting arrangement for lifting the rear end of the first trailer and the front end of the second trailer into an empty transport position so that the first and second trailers are supported from the ground on the rear wheels of the tractor and the ground wheels of the rearmost axle of the second trailer, with the ground wheels of the first trailer being spaced from the ground and with the ground wheels of said at least one additional axle being spaced from the ground;

each of the axles of the first trailer including a lifting device for supporting the axle at a raised position relative to the first frame;

each of the said at least one additional axle of the second trailer including a lifting device for supporting the axle at a raised position relative to the second frame;

in the empty transport position, the first and second trailers being maintained in a directly aligned position with no freedom to pivot side to side at the king pin of the second trailer such that the first and second trailers can be towed as a single integral trailer supported only on the tractor and the rear wheels of the second trailer.

Preferably each of the axles includes an air bag suspension and wherein each lifting device comprises a hook arrangement for engaging the respective axle and holding the axle at a raised position relative to the frame when the axle is raised relative to the frame by releasing the air from the air bag suspension Preferably the load box on the front trailer is located forward so that the load is applied primarily to the rear wheels of the tractor and the second trailer locates the load box in symmetrical manner between the front and rear of the second trailer so as to apply its load to the rear wheels of the first trailer and the rear wheels of the second trailer.

Preferably the front load box dumps to the side and the rear load box dumps to the rear.

Preferably the lifting arrangement is actuated by a lifting device on the second trailer which acts to lift a rear end of the first trailer and wherein the king pin of the second trailer is maintained in position at the fifth wheel of the first trailer.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

The dual trailer arrangement 10 of the present invention is arranged for towing by a highway tractor 11 having a fifth wheel 12 supported over rear ground wheels 13. The tractor is a conventional tractor and includes a frame 14 carrying a cab and engine 15 on front steering wheels 16.

The dual trailer the arrangement 10 includes a first trailer portion 17 and a second trailer portion 18. The first trailer portion includes a load box 19 at a forward end so as to apply load to the rear wheels 13 of the tractor. The load box can dump to one side by lift cylinders 19A The first trailer portion includes a king pin 17A at the front end for attachment to a fifth wheel 25 of the tractor and two or three axles defining rear wheels 22 at the rear end of a frame 21.

The second trailer portion has a king pin 18A at a forward end and two or three axles defining rear wheels 24 at the rear end of the frame 23. The second trailer portion includes a load box 20 at a centrally mounted so as to apply load to the rear wheels 24 of the rear trailer portion and through the fifth wheel 25 to the rear wheels 22 of the front trailer portion. The box 20 can dump to the rear lifted by a front lift cylinder 20A.

Figure 2:
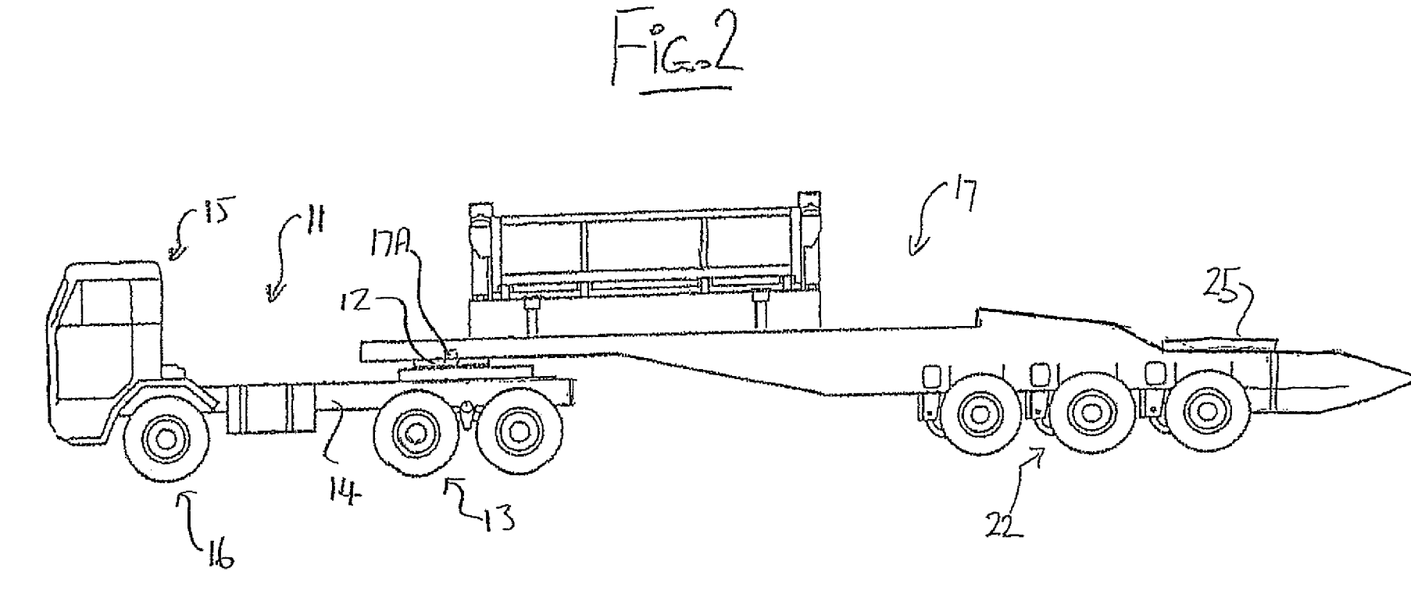
FIG. 2 is a side elevational view of a tractor with the first trailer of the dual trailer assembly of FIG. 1 showing the trailer in the loaded position.
Figure 3:
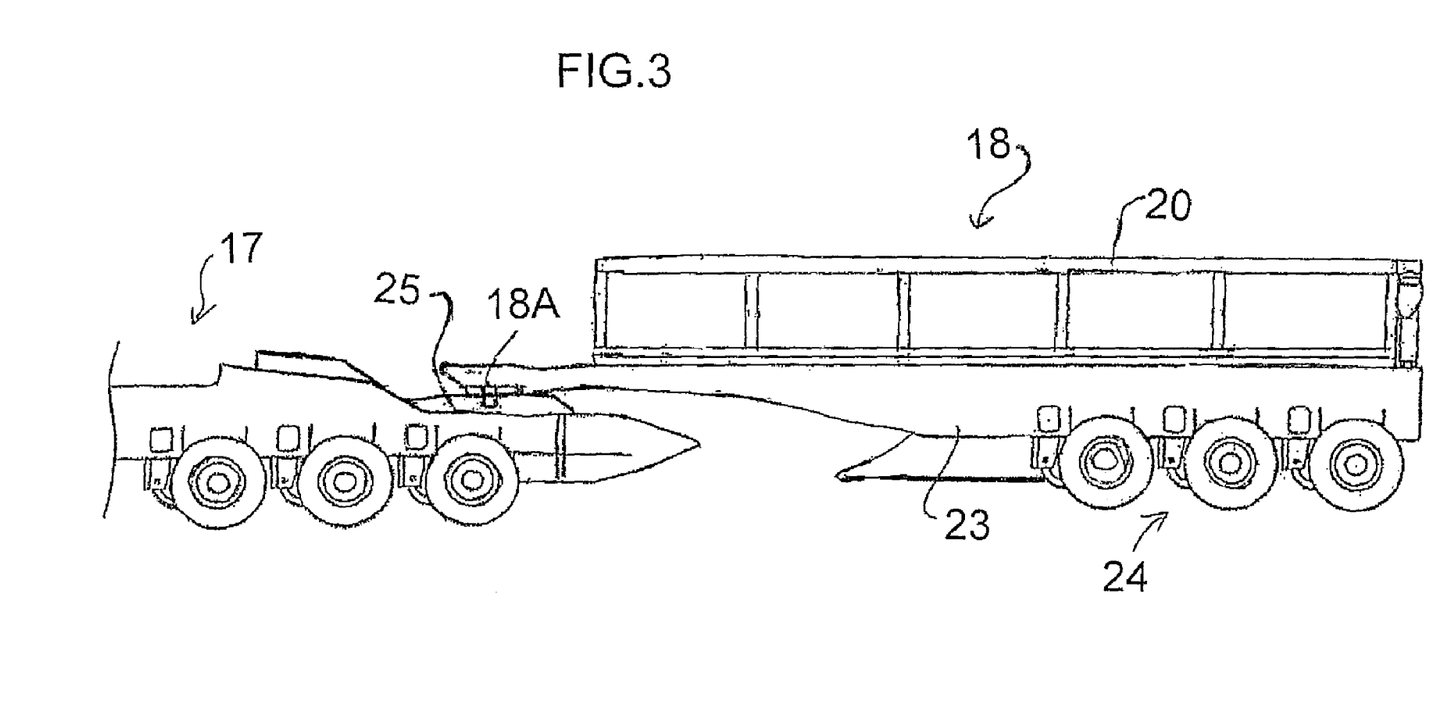
FIG. 3 is a side elevational view of a rear part of the first trailer and the second trailer of the dual trailer assembly of FIG. 1 showing the trailer in the loaded position.

In the loaded position shown in FIGS. 2 and 3 the trailers are supported on all axles of the tractor and trailer so as to spread the load of the material in the dump boxes. In this arrangement the trailer is generally of a conventional and widely used construction.

Figure 1:
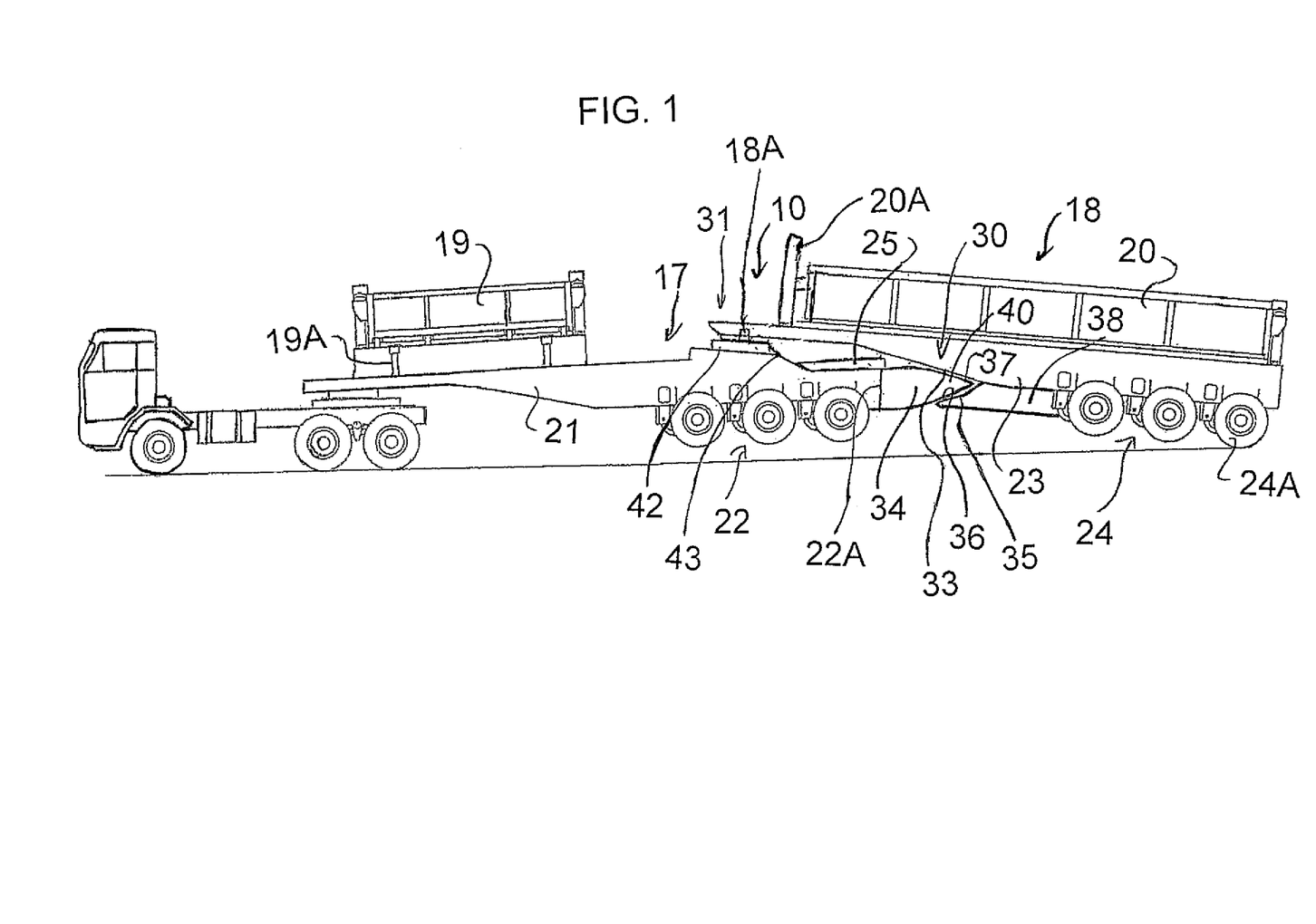
FIG. 1 is a side elevational view of a tractor with a first embodiment of a dual trailer assembly according to the present invention showing the trailer in the empty transport position.

A lifting arrangement 31, 32 is provided for lifting the rear end of the first trailer and the front end of the second trailer into the empty transport position shown in FIG. 1 so that the first and second trailers are supported from the ground on the rear wheels 13 of the tractor and the rear wheels 24 of the second trailer with the rear wheels 22 of the first trailer spaced from the ground.

A locking arrangement 31, 32 is provided for locking the first and second trailers in a directly aligned position with no freedom to pivot side to side at the king pin 18A of the second trailer such that the first and second trailers can be towed as a single integral rigid trailer supported only on the tractor and the rear wheels of the second trailer when the load boxes are empty.

In the empty transport position, only a rearmost 24A one of the axles of the second trailer has its wheels on the ground.

The lifting and locking arrangement includes a first portion 31 and a second portion 32. These are both actuated by the rearward movement of the first trailer relative to the second trailer by backing up the tractor.

The lifting arrangement includes a lifting surface arrangement 35 on the second trailer which co-operates with a portion 34 of the first trailer so that the rearward movement causes relative sliding movement between the lifting surface 35 and a co-operating surface 36 of the portion 34.

The portion 34 of the first trailer is preferably a separate piece attached to the rear 22A of the frame 22 of the first trailer. The portion 34 is tapered to form top and bottom surfaces 33 and 36 which converge to a rear apex 37 which is forced into a receptacle 38 on the rear trailer portion with the guide surface 35 forming a bottom of the receptacle.

The portion 34 is also tapered rearwardly and inwardly at the sides 40 so as to provide a wedging action side to side into the correspondingly shaped receptacle 38 on the second trailer at the surface 35.

Thus the rear locking and lifting portion 30 lifts and locks the rear of the portion 34 to the trailer 18.

The front locking and lifting portion 31 lifts and locks the front of the trailer 18 to the top of the trailer 17. Thus the king pin 18A of the second trailer is arranged to move forwardly relative to the fifth wheel 25 of the first trailer to a locking position 42 in front of the fifth wheel 25. This can be provided by making the fifth wheel 25 in a reverse arrangement to the conventional so that its slot runs forwardly from the locked position. Thus the king pin 18A runs up a lifting ramp 43 to the locking position at the front of the slot. Thus the co-operation between the king pin 18A of the second trailer in its locking position in front of the fifth wheel of the first trailer together with the co-operation of the lifting surface arrangement 35, 36 with the portion 34 of the first trailer maintains the trailers in the raised empty transport position.

Also the co-operation between the king pin 18A of the second trailer in its slot in the locking position in front of the fifth wheel 25 of the first trailer together with the co-operation of the converging sides 40 of the lifting surface arrangement 35, 36 maintains the trailers in the directly aligned position. The king pin 18A of the second trailer is moved into a slot on the first trailer and holds the king pin against movement upwardly and downwardly and side to side. Thus the two trailer portions when coupled form a rigid single trailer which can be towed on the tractor within existing length and construction rules for single trailers. In addition the dual trailer arrangement is also conventional and thus meets existing rules.

Figure 4:
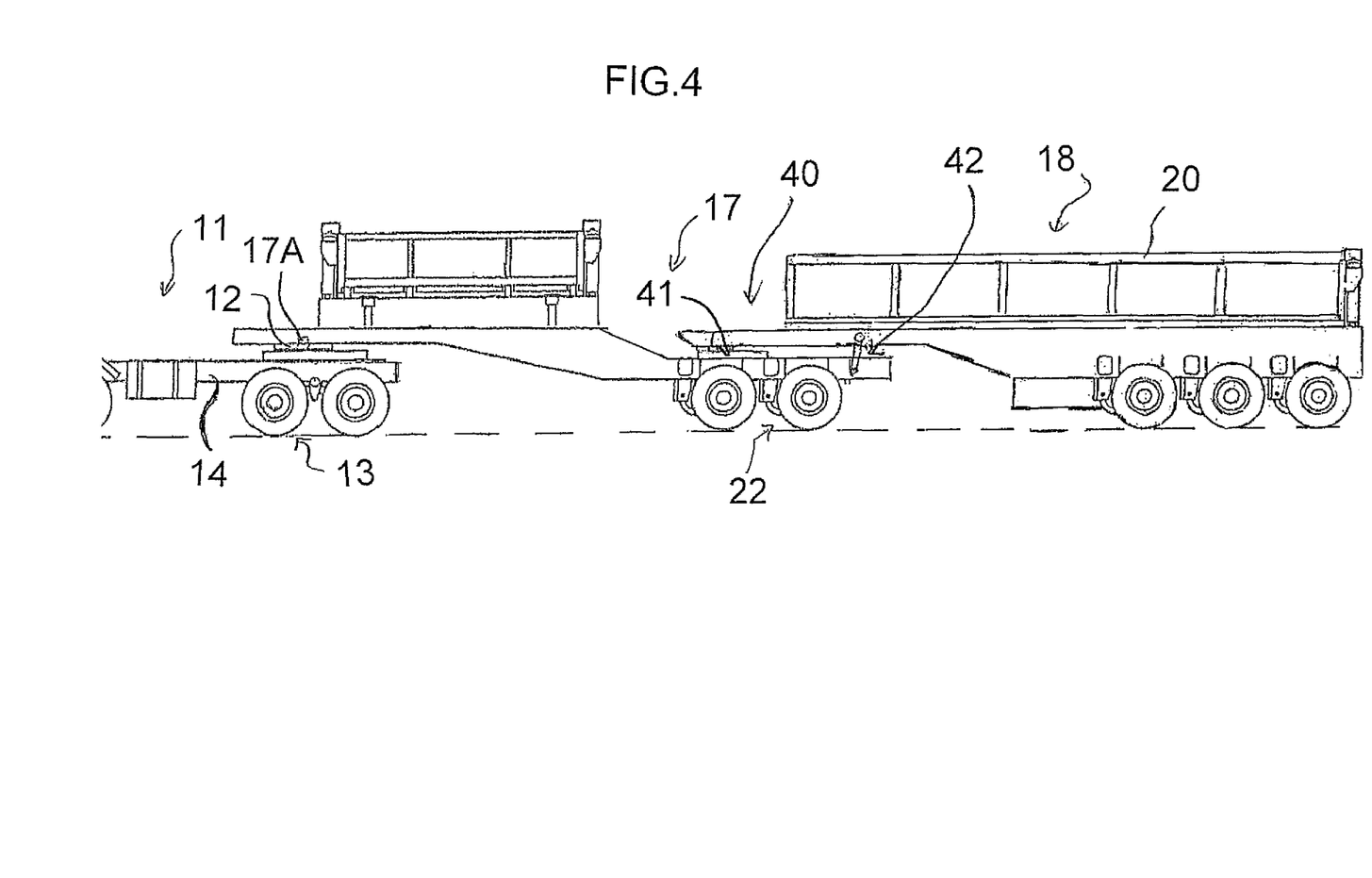
FIG. 4 is a side elevational view of a tractor with a second embodiment of a dual trailer assembly according to the present invention showing the trailer in the loaded transport position.
Figure 5:
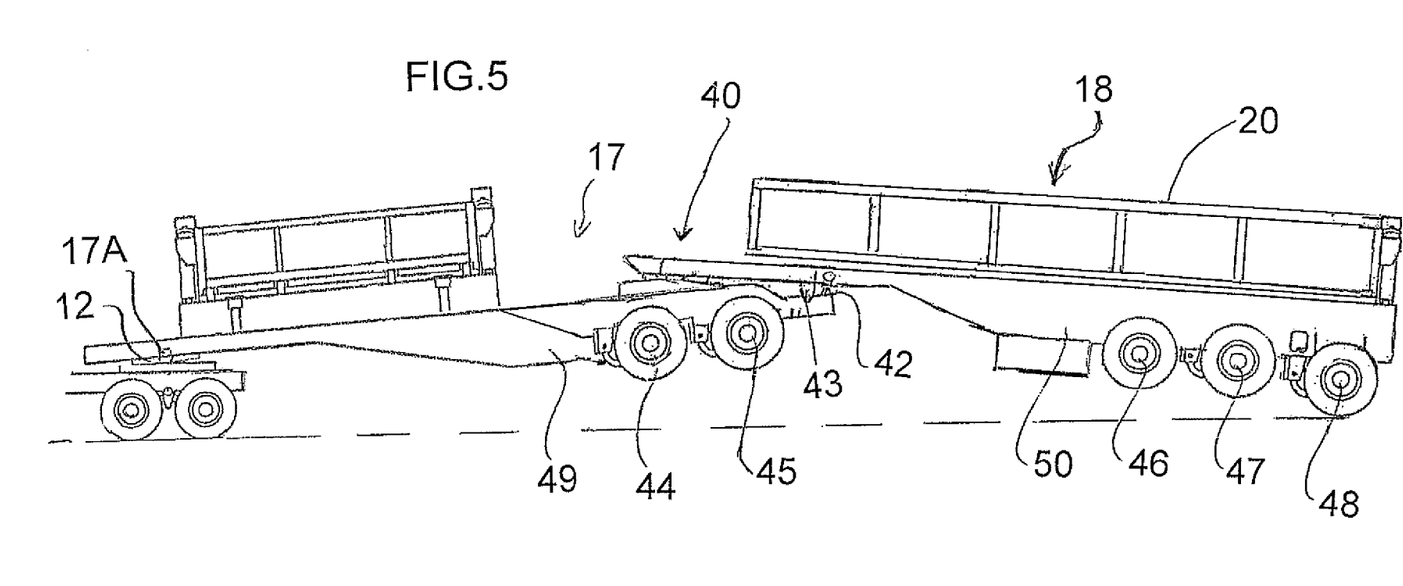
FIG. 5 is a side elevational view of a tractor with the first trailer of the dual trailer assembly of FIG. 4 showing the trailer in the empty position.
Figure 6:
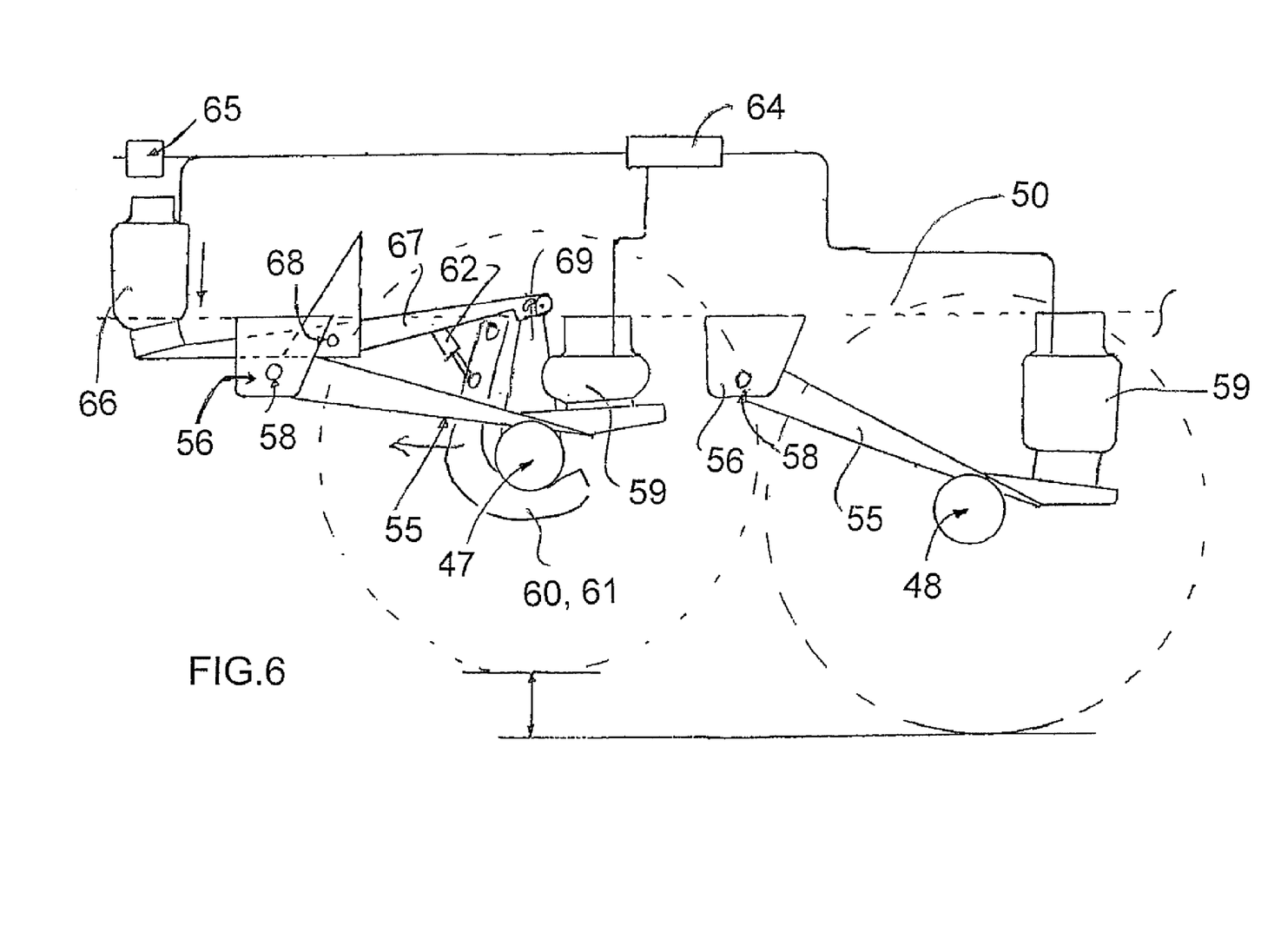
FIG. 6 is a side elevational view of one of the axles of the trailer of FIG. 4 showing the axles lifting arrangement.

Turning now to FIGS. 4, 5 and 6 there is shown a similar arrangement which includes all of the components which use common reference numbers with FIGS. 1 and 2.

A number of key differences are however included. Thus the king pin 40 of the rear trailer and the fifth wheel 41 of the front trailer remain in fixed position rather than are free to move forwardly and rearwardly. Thus the forward end of the rear trailer is fixed to the fifth wheel and cannot move side to side or front to rear at that location.

This the lifting system 42 which acts to lift the rear end of the front trailer upwardly toward the front of the rear trailer is now an actuator such as a hydraulic or air cylinder and does not rely in rear movement of the front trailer. The lift system preferably comprises two cylinders on respective sides of the frame so that when lifted the rear end of the front frame is drawn into butting engagement with a pair of stops 43 on the rear frame which locate the two trailers together and prevent front to rear or more importantly side to side movement. Thus the longitudinal spacing of the king pin relative to the stops ensures that there can be no twisting of the trailers about a vertical axis and they are held aligned.

Further, each of the axles 44 and 45 of the front trailer and the two additional axles 46 and 47 of the rear trailer are arranged so that they can be lifted relative to the frame 49, 50 of the respective trailer. This lifting action ensures that the ground wheels are raised from the ground relative to the frame so that the lifting device 42 does not need to lift the frames to the height required in FIG. 1 to ensure that the wheels remain spaced from the ground while accommodating ground height changes.

A suitable lift mechanism is shown in FIG. 6 where the rearmost axle 48 is shown in the lowered position as this axle remains lowered in both the loaded and transport positions. Thus each axle is mounted on a leading suspension link 55 which pivots on a pivot pin 58 of a support 56. The pivotal movement is resisted by an air bag spring 59 operating relative to the frame 50. When the air bags 59 are compressed by releasing the air from the bags, the axle 47 is engaged by a pair of hook members 60, 61 at spaced positions across the frame so as to hold the axle 47 raised. The hooks are actuated to the holding and release portions by a cylinder 62. Air to the bags is controlled by a control system 64 from a supply 65. The bags can be compressed simply by the weight of the frame when the air is removed or an assist cylinder 66 can be provided to apply pressure to a pivotal link 76 mounted on a pivot 68 which acts to lift a link 69 attached to the axle.

Thus, in the empty transport position, the first and second trailers are maintained in a directly aligned position with no freedom to pivot side to side at the king pin of the second trailer such that the first and second trailers can be towed as a single integral trailer supported only on the tractor and the rear wheels of the second trailer.

Thus each of the axles includes an air bag suspension and each lifting device comprises a hook arrangement for engaging the respective axle and holding the axle at a raised position relative to the frame when the axle is raised relative to the frame by releasing the air from the air bag suspension.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A dual trailer arrangement for towing by a highway tractor having a fifth wheel supported over rear ground wheels, the arrangement comprising:
   a first trailer portion with a king pin at the front end for attachment to the fifth wheel of the tractor and two or three axles having ground rear wheels thereon at the rear end;
   a load box on the first trailer;
   a second trailer having a king pin at a forward end and at the rear end a rearmost axle having ground rear wheels thereon and at least one additional axle having ground rear wheels thereon in front of the rearmost axle;
   a load box on the second trailer;
   a fifth wheel at the rear end of the first trailer for receiving the king pin of the second trailer;
   such that in a loaded position the trailers are supported on all axles;
   a lifting arrangement for lifting the rear end of the first trailer and the front end of the second trailer into an empty transport position so that the first and second trailers are supported from the ground on the rear wheels of the tractor and the ground wheels of the rearmost axle of the second trailer, with the ground wheels of the first trailer being spaced from the ground and with the ground wheels of said at least one additional axle being spaced from the ground;
   and a locking arrangement for locking, in the empty transport position, the first and second trailers in a directly aligned position with no freedom to pivot side to side at the king pin of the second trailer such that the first and second trailers can be towed as a single integral trailer supported only on the tractor and the rear wheels of the second trailer when the load boxes are empty.

2. The arrangement according to claim 1 wherein the load box on the front trailer is located forward so that the load is applied primarily to the rear wheels of the tractor and the second trailer locates the load box in symmetrical manner between the front and rear of the second trailer so as to apply its load to the rear wheels of the first trailer and the rear wheels of the second trailer.

3. The arrangement according to claim 1 wherein the front load box dumps to the side and the rear load box dumps to the rear.

4. The arrangement according to claim 3 wherein the lifting arrangement is actuated by rearward movement of the first trailer relative to the second trailer and includes a lifting surface arrangement on the second trailer which cooperates with a portion of the first trailer so that the rearward movement causes relative sliding movement between the lifting surface and the portion and wherein the king pin of the second trailer is arranged to move forwardly relative to the fifth wheel of the first trailer to a locking position in front of the fifth wheel.

5. The arrangement according to claim 4 wherein the co-operation between the king pin of the second trailer in its locking position in front of the fifth wheel of the first trailer together with the co-operation of the lifting surface arrangement with the portion of the first trailer maintains the trailers directly aligned in the empty transport position.

6. The arrangement according to claim 4 wherein the king pin of the second trailer is moved into a slot on the first trailer holds the king pin against movement upwardly and downwardly and side to side.

7. A dual trailer arrangement for towing by a highway tractor having a fifth wheel supported over rear ground wheels, the arrangement comprising:
 a first trailer having first frame with a king pin at a front end for attachment to the fifth wheel of the tractor and at a rear end two or three axles having ground rear wheels thereon;
 a load box on the first trailer;
 a second trailer having a second frame with a king pin at a forward end and at a rear end a rearmost axle having ground rear wheels thereon and at least one additional axle having ground rear wheels thereon in front of the rearmost axle;
 a load box on the second trailer;
 a fifth wheel at the rear end of the first trailer for receiving the king pin of the second trailer;
 such that in a loaded position the trailers are supported on all axles;
 a lifting arrangement for lifting the rear end of the first trailer and the front end of the second trailer into an empty transport position so that the first and second trailers are supported from the ground on the rear wheels of the tractor and the ground wheels of the rearmost axle of the second trailer, with the ground wheels of the first trailer being spaced from the ground and with the ground wheels of said at least one additional axle being spaced from the ground;
 each of the axles of the first trailer including a lifting device for supporting the axle at a raised position relative to the first frame;
 each of the said at least one additional axle of the second trailer including a lifting device for supporting the axle at a raised position relative to the second frame;
 in the empty transport position, the first and second trailers being maintained in a directly aligned position with no freedom to pivot side to side at the king pin of the second trailer such that the first and second trailers can be towed as a single integral trailer supported only on the tractor and the rear wheels of the second trailer.

8. The arrangement according to claim 7 wherein each of the axles includes an air bag suspension and wherein each lifting device comprises a hook arrangement for engaging the respective axle and holding the axle at a raised position relative to the frame when the axle is raised relative to the frame by releasing the air from the air bag suspension.

9. The arrangement according to claim 7 wherein the load box on the front trailer is located forward so that the load is applied primarily to the rear wheels of the tractor and the second trailer locates the load box in symmetrical manner between the front and rear of the second trailer so as to apply its load to the rear wheels of the first trailer and the rear wheels of the second trailer.

10. The arrangement according to claim 7 wherein the front load box dumps to the side and the rear load box dumps to the rear.

11. The arrangement according to claim 7 wherein the lifting arrangement is actuated by a lifting device on the second trailer which acts to lift a rear end of the first trailer and wherein the king pin of the second trailer is maintained in position at the fifth wheel of the first trailer.

* * * * *